J. M. SCHEBLER.
COMPRESSING DEVICE FOR CORN SHOCKS.
APPLICATION FILED OCT. 18, 1917.

1,277,759.

Patented Sept. 3, 1918.

Witness
Frank A. Fahl

Inventor
John M. Schebler,
By Hood & Schley
Attorneys

UNITED STATES PATENT OFFICE.

JOHN M. SCHEBLER, OF HAMBURG, INDIANA.

COMPRESSING DEVICE FOR CORN-SHOCKS.

1,277,759.  Specification of Letters Patent.  Patented Sept. 3, 1918.

Application filed October 18, 1917. Serial No. 197,202.

*To all whom it may concern:*

Be it known that I, JOHN M. SCHEBLER, a citizen of the United States, residing at Hamburg, in the county of Franklin and State of Indiana, have invented a new and useful Compressing Device for Corn-Shocks, of which the following is a specification.

It is the object of my invention to provide a corn shock compressor, whereby the corn which has been assembled in a shock may be compressed with a minimum of effort, so that it may be tied to hold it in the shock form.

Figure 1:
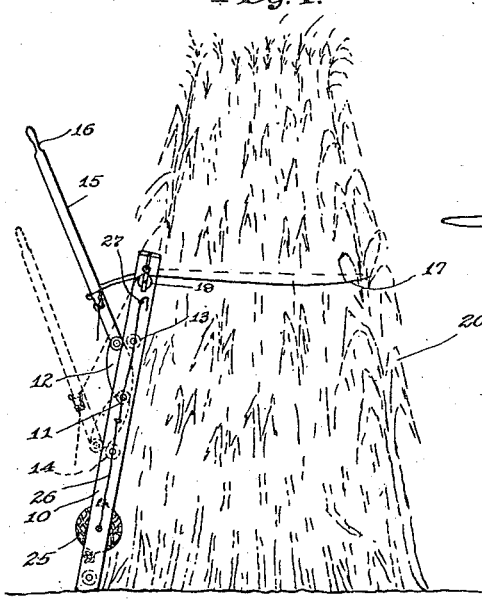
Figure 2:
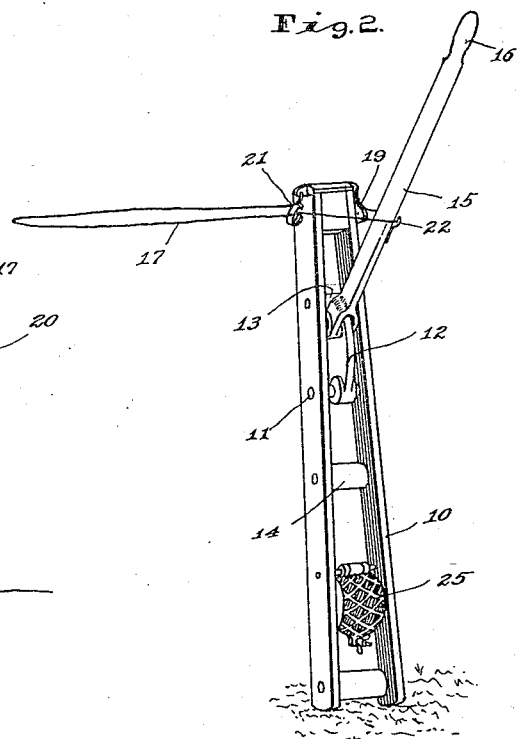
Figure 3:
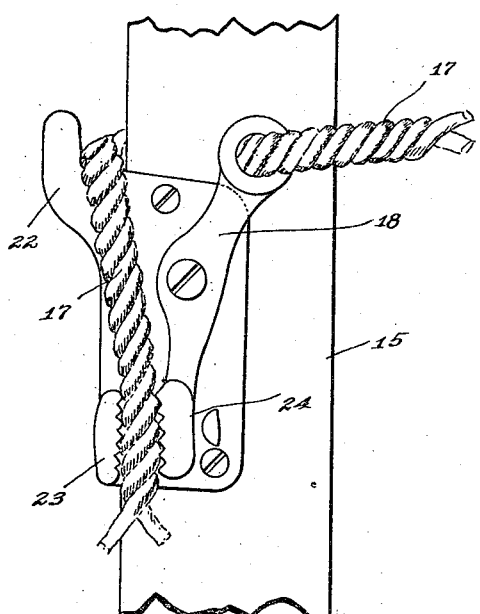
Figure 4:
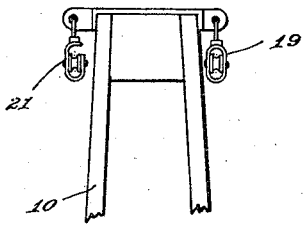

The accompanying drawing illustrates my invention. Figure 1 is a side elevation of my compressor, showing it in the position it would have in relation to a corn shock at the beginning of the compressing operation; Fig. 2 is a perspective view of my compressor; Fig. 3 is a detail of the locking device for the compressing rope; and Fig. 4 is a front elevation of the upper end of the compressor frame, showing the pulleys.

The compressor frame 10 conveniently consists of a pair of uprights, preferably closer at the top than at the bottom, and suitable cross pieces connecting such uprights. On a cross pin between the two uprights of the frame is pivotally mounted a swinging arm 12, which may be swung either to the full line or the dotted line position shown in Fig. 1, so that its free end bears either against the cross piece 13 if it is swung upward or against the cross piece 14 if it is swung downward. An operating lever 15 is pivotally mounted on the free end of the swinging arm 12, and at its free end is provided with a handle 16 for the operator to grasp. A compressing rope 17 has one end permanently attached to a clamping lever pivoted on the arm 15. This compressing rope 17 passes from the clamping lever 18 through a pulley 19 on one side of the upper end of the frame 10, thence around the corn shock 20, then through a second pulley 21 on the other side of the upper end of the frame, which pulley 21 is preferably an open pulley so that the rope 17 may be slipped laterally into and out of place therein and does not require to be threaded therethrough, and then over a hook 22 on the rear edge of the operating lever 15 and between a fixed clamping jaw 23 and a clamping jaw 24 on the clamping lever 18. The end of the rope which passes between the clamping jaws 23 and 24 is removable from the operating lever 15 and from the pulley 21, so as to permit it to be put around or taken from around the corn shock 20.

Mounted in the lower end of the frame 10, is a twine holder 25 of any suitable construction. From this twine holder the twine 26 may be drawn through suitable eyes 27 on the edge of the frame 10, for use in tying the corn shock after it has been compressed.

In operation, the frame 10 is leaned against the side of the corn shock which is ready for compression and tying, the compressing rope 17 is passed from the pulley 19 around the corn shock and then placed in the pulley 21, over the hook 22, and between the clamping jaws 23 and 24. At this time, the swinging arm 12 is in its upper position, so that it bears against the cross piece 13, as indicated in Fig. 2 and in full lines in Fig. 1, and the operating lever 15 is swung upward as illustrated. After the compressing rope 17 has thus been put in place, the operator swings the lever 15 downward, thus making smaller the loop of the compressing rope 17 in which the corn shock 20 is included. The pull of the rope 17 on the clamping lever 18 serves to clamp the free end of such rope between the clamping jaws 23 and 24. When the operating lever 15 has been swung down to obtain this compression of the corn shock, it is allowed to swing up again, and the swinging arm 12 is swung downward from the cross piece 13 into engagement with the cross piece 14, as illustrated in dotted lines in Fig. 1. While this relieves the compression on the corn shock, the corn shock expands only slightly and does not resume its original size, so that this may be done with ease. Then with the swinging arm 12 in its lowermost position, the operating lever 15 is again swung down, thus producing further compression of the corn shock 20. Thus the compression is obtained in two separate compressing operations, by the same lever, the fulcrum of such lever being shifted downward between the two compressing operations so that a relatively large total compressing action is obtained. This total compressing action is thus obtained in two parts with less effort by the operator on the operating lever 15 than if the same compression were obtained by a single swing of a lever having a longer lever arm for the attachment of the compressing rope, for it is found in practice that if the lever arm for the attachment of the compressing rope is made sufficiently long to obtain all the desired compression in one operation it is necessary either to make the operating lever 15 unduly long or to require the operator to expend an excessive amount of force in the compressing action. This undue length of the operating arm 15 and the necessity for the expenditure of the excessive force by the operator are avoided by the use of the shifting fulcrum for the operating lever and the production of the compressing action in two operations.

Moreover, in obtaining both parts of the compressing action, the movement of both ends of the rope 17 is the same, so that the pull is equal in opposite directions around the corn shock; and in consequence there is no tendency to twist the shock.

After the compression of the shock has thus been obtained by the two-part compressing action, the twine 26 is drawn from the twine holder 25 and the shock is tied in its compressed condition. Then the lever 15 is released to permit the removal of the rope 17 from between the clamping jaws 23 and 24, the rope 17 is removed from the hook 22 and the pulley 21 and from around the shock 20, and the compressor is taken to the next shock to be compressed and the action is repeated.

I claim as my invention:

1. In a cord shock compressor, the combination of a frame, an operating lever mounted on said frame, a compressing rope arranged to be passed around the corn shock and attached to said operating lever so that the loop formed by the rope around the corn shock may be made smaller by the operation of the lever, said lever being permanently connected to said frame so that its fulcrum may be shifted to different positions for successive manipulations of the compressing rope.

2. In a corn shock compressor, the combination of a frame, a swinging arm pivotally mounted thereon and swingable to two positions, an operating lever pivotally mounted on the free end of such swinging arm so that its fulcrum is shifted by the swinging of said swinging arm to different positions, and a compressing rope associated with said frame and said operating lever to form around the corn shock a loop which is made smaller by the operation of said operating lever.

3. In a corn shock compressor, the combination of a frame, an operating lever mounted on said frame, a compressing rope arranged to be passed around the corn shock and attached to said operating lever at both ends of the loop formed by the rope around the corn shock so that said loop may be made smaller by the operation of the lever, said lever being permanently connected to said frame so that its fulcrum may be shifted to different positions for successive manipulations of the compressing rope.

4. In a corn shock compressor, the combination of a frame, a swinging arm pivotally mounted thereon and swingable to two positions, an operating lever pivotally mounted on the free end of such swinging arm so that its fulcrum is shifted by the swinging of said swinging arm to different positions, and a compressing rope associated with said frame to form a loop around the corn shock and having both ends of the loop attached to said operating lever so that by the operation of said operating lever the loop around the corn shock is made smaller by being drawn from both ends.

In witness whereof, I have hereunto set my hand at Hamburg, Indiana, this 15th day of October, A. D. one thousand nine hundred and seventeen.

JOHN M. SCHEBLER.

Copies of this patent may be obtained for five cents each, by addressing the "Commissioner of Patents, Washington, D. C."